(12) United States Patent
VanBerg, Jr. et al.

(10) Patent No.: US 8,531,057 B1
(45) Date of Patent: Sep. 10, 2013

(54) FARADAY ELECTRICAL ENERGY SINK FOR A POWER BUS

(75) Inventors: Charles F. VanBerg, Jr., Mansfield, TX (US); David L. Hoelscher, Arlington, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 854 days.

(21) Appl. No.: 12/536,586

(22) Filed: Aug. 6, 2009

Related U.S. Application Data

(60) Provisional application No. 61/107,481, filed on Oct. 22, 2008.

(51) Int. Cl.
*H02J 1/00* (2006.01)

(52) U.S. Cl.
USPC .......................................................... 307/44

(58) Field of Classification Search
USPC .......................................................... 307/44
See application file for complete search history.

(56) References Cited

U.S. PATENT DOCUMENTS

| | | | |
|---|---|---|---|
| 4,657,829 A * | 4/1987 | McElroy et al. | 429/425 |
| 4,866,607 A | 9/1989 | Anderson et al. | 364/422 |
| 5,153,832 A | 10/1992 | Anderson et al. | 364/422 |
| 5,202,194 A | 4/1993 | VanBerg, Jr. | 429/13 |
| 5,252,918 A | 10/1993 | VanBerg et al. | 324/207.19 |
| 5,299,640 A | 4/1994 | Streich et al. | 166/327 |
| 5,337,234 A | 8/1994 | Anderson et al. | 364/422 |
| 5,767,671 A | 6/1998 | McCoy et al. | 324/209 |
| 6,787,933 B2 * | 9/2004 | Claude et al. | 290/52 |
| 7,159,129 B2 * | 1/2007 | Pincu et al. | 713/300 |
| 2006/0166044 A1 * | 7/2006 | Charlat | 429/7 |
| 2008/0292917 A1 * | 11/2008 | Bimbaud | 429/13 |

FOREIGN PATENT DOCUMENTS

JP   5-142396 A   6/1993

OTHER PUBLICATIONS http://en.wikipedia.org/wiki/Electrolysis (Feb. 5, 2008) (pp. 1-5).
http://en.wikipedia.org/wiki/Electrolysis of Water (Feb. 5, 2008) (pp. 1-4).
http://en.wikipedia.org/wiki/Fuel_Cell (Feb. 5, 2008) (pp. 1-11).
http://en.wikipedia.org/wiki/Proton_exchange_membrane_fuel_cell (Feb. 5, 2008) (pp. 1-4).

* cited by examiner

*Primary Examiner* — Hal Kaplan
(74) *Attorney, Agent, or Firm* — Withrow & Terranova, PLLC

(57) ABSTRACT

A power management technique for a power bus includes a method and apparatus employing a Faraday electrical energy sink for a power bus. In general, the technique powers a power bus from a fuel cell plant when the actual voltage of the power bus is less than or equal to a nominal voltage for the power bus and sinks power from the power bus into the fuel cell plant when the actual voltage exceeds the nominal voltage.

44 Claims, 2 Drawing Sheets

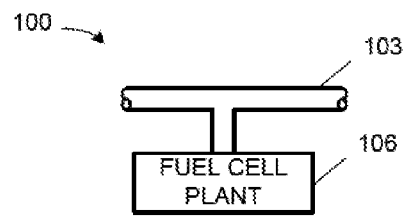
FIG. 1
FIG. 2
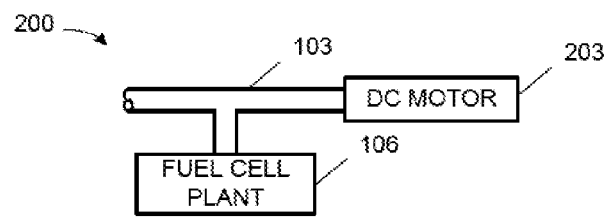
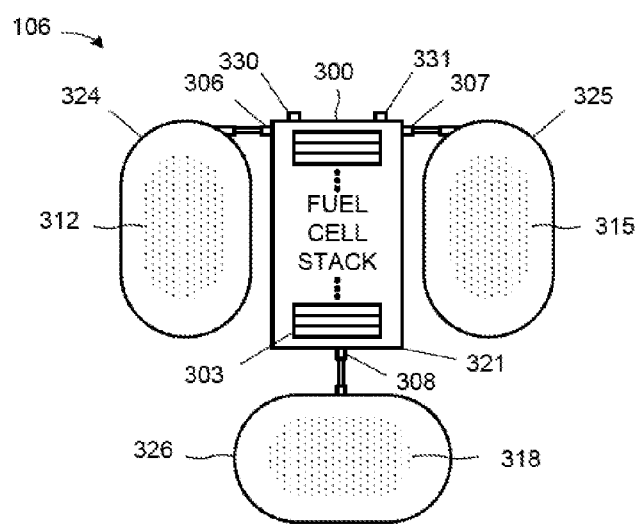
FIG. 3

FARADAY ELECTRICAL ENERGY SINK FOR A POWER BUS

Priority to the earlier effective filing date of U.S. Provisional Application 61/107,481, entitled "Faraday electrical energy sink for a power bus", and filed Oct. 22, 2008, in the name of the inventors Charles F. VanBerg Jr. and David L. Hoelscher is hereby claimed under 35 U.S.C. §119(e). The '481 application is also hereby incorporated by reference in its entirety and for all purposes.

BACKGROUND OF THE INVENTION

1. Field of the Invention

The present invention pertains to power management on a power bus, and, more particularly, to a Faraday electrical energy sink for a power bus.

2. Description of the Related Art

Electro-mechanical systems frequently generate power that is delivered to, for example, a motor over a power bus. The power bus has a nominal voltage at which the power source generates and delivers the power. However, it sometimes happens that one or more of the motor loads will generate power back onto the power bus in addition to that produced by the source.

For example, some aircraft use motors to operate flight control surfaces. A flight control surface such as a aileron or a rudder is rotated from a neutral position to effect a change in the heading of the aircraft. The power source generates a direct current ("DC") power signal onto the bus that powers the motor. This power signal is delivered at the nominal voltage level of the power bus over which it is delivered. The flight control surface is then rotated back to its neutral position by the airflow across the flight control surface. Not only does this rotation not consume power off the power bus, but the rotation of the DC motor in the opposite direction generates additional power back onto the power bus. The actual voltage, or the actual measurable voltage (which may change with time), on the power bus momentarily exceeds the nominal voltage at this point.

The excess power needs to be managed to an "overvoltage" condition that may cause prevent damage to the apparatus. "Overvoltage" is a condition in which the actual voltage exceeds the maximum bus voltage, which is a specification-defined voltage value that the actual voltage should not exceed. Several techniques have been developed. For example, one approach simply dissipates the excess energy as heat in a resistive element. Another approach stores the energy in, for example, a capacitor bank, a flywheel, or a magnetic superconductor bank. Each of these management approaches possesses some drawback. Heat dissipation can lead to heat management problems in some applications and is inefficient. Capacitor banks require additional regulators to discharge the energy. Each of these factors may pose problems in some applications.

The present invention is directed to resolving, or at least reducing, one or all of the problems mentioned above.

SUMMARY OF THE INVENTION

The present invention pertains to power management on a power bus, and, more particularly, to a Faraday electrical energy sink for a power bus.

In a first aspect, the present invention is a method, comprising: powering a power bus from a fuel cell plant when the actual voltage is less than or equal to a nominal voltage for the power bus; and sinking power from the power bus into the fuel cell plant when the actual voltage exceeds the nominal voltage.

In a second aspect, the present invention is an apparatus, comprising: means for powering a power bus when the actual voltage is less than or equal to a nominal voltage for the power bus; and means for sinking power from the power bus when the actual voltage exceeds the nominal voltage.

In a third aspect, the present invention is a method, comprising sinking power from a power bus into a fuel cell plant when the actual voltage for the power bus approaches the power bus maximum voltage limits and powering the power bus from the fuel cell plant otherwise.

In a fourth aspect, the present invention is an apparatus, comprising: a power bus; and a fuel cell plant. The fuel cell plant is capable of: powering the power bus when the actual voltage is less than or equal to a nominal voltage for the power bus; and sinking power from the power bus when the actual voltage exceeds the nominal voltage.

In a fifth aspect, the present invention is an apparatus, comprising: means for transmitting power to an electrical load; and means for: powering the power bus when the actual voltage is less than or equal to a nominal voltage for the power bus; and sinking power from the power bus when the actual voltage exceeds the nominal voltage.

BRIEF DESCRIPTION OF THE DRAWINGS

The invention may be understood by reference to the following description taken in conjunction with the accompanying drawings, in which like reference numerals identify like elements, and in which:

FIG. 1 is a block diagram of one particular embodiment of the present invention in a first aspect;

FIG. 2 depicts one particular implementation of the embodiment of FIG. 1;

FIG. 3 is a block diagram of one particular embodiment of the fuel cell plant first shown in FIG. 1;

Figure 4:
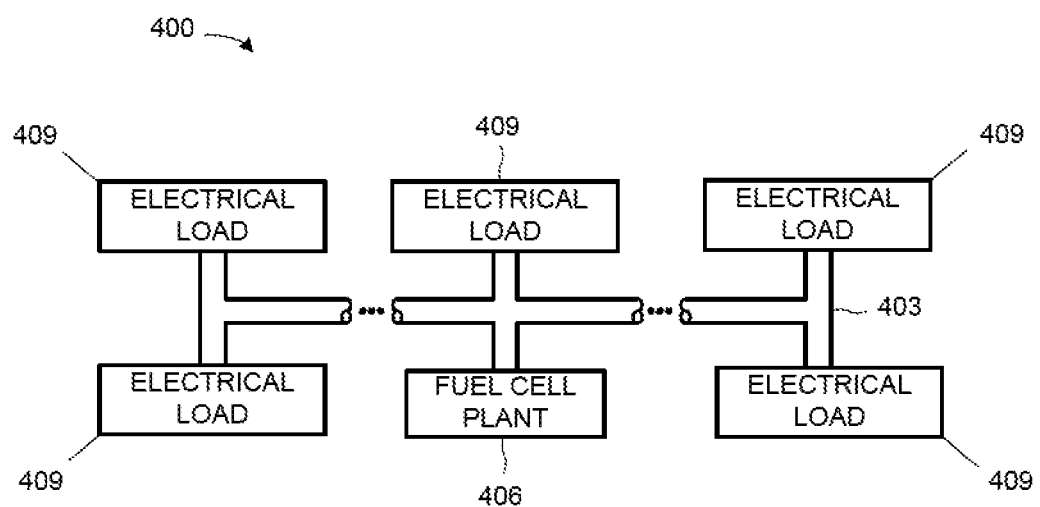
FIG. 4 illustrates a second embodiment in which multiple electrical loads are connected to the power bus.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates an apparatus 100 comprising a power bus 103 and a fuel cell plant 106. In accordance with the invention, and as will be described further below, the fuel cell plant 106 has two functions. First, it powers the power bus 103 when the actual voltage of the power bus is less than or equal to a nominal voltage for the power bus 103. Second, the fuel cell plant 106 sinks power from the power bus 103 when the actual voltage exceeds the nominal voltage. The fuel cell plant 106 may also "idle" when the power bus 103 is at nominal voltage.

More particularly, those skilled in the art having the benefit of this disclosure will appreciate that the power bus 103 will have a number of electrical loads thereon. One such embodiment 200 is shown in FIG. 2, in which the power bus 103 has a single electrical load—i.e., an electrical motor 203. The electrical motor 203 is, more particularly, a direct current ("DC") motor.

In the illustrated embodiment, the electrical motor 203 controls the orientation of a flight control surface (not shown), such as a wing flap, for a high performance aircraft. The flight control surface is nominally in a neutral position. For a wing flap, that means the wing flap is neither raised nor lowered, but is aligned with the rest of the wing surface. The aircraft affects a maneuver by raising or lowering the wing flap to change the aerodynamic forces acting on the aircraft. This includes actuating the DC motor 203, which draws power from the power bus 103.

The flight control surface returns to its neutral position when the maneuver is completed. This particular embodiment uses the airflow over the wing to return the flight control surface into alignment with the rest of the wing surface. Allowing the flight control surface to return to its neutral position involves only de-actuating the electrical motor 203 that was operating against the airflow to move the wing flap out of its neutral position. At this point, the electrical motor 203 is not drawing power from the power bus 103. It is, in fact, actually generating power onto the power bus 103. This causes the actual voltage on the power bus 103 to exceed its rated voltage limits. The excess power, represented by the difference between the actual and nominal voltage values for the power bus 103, is to be captured or stored.

In accordance with the present subject matter, this excess power is sunk into the fuel cell plant 106. One particular embodiment of the fuel cell plant 106 is illustrated in FIG. 3. The fuel cell plant 106 is built around a fuel cell stack 300. The fuel cell stack 300 comprises a plurality of fuel cells 303 (only one indicated).

A fuel cell is an electrochemical apparatus, i.e., it generates electricity through a chemical reaction. The fuel cell typically houses an electrolyte, which is a substance containing free ions that behaves as an electrically conductive medium, between a pair of electrodes. The electrodes are called a "cathode" and an "anode". A fuel and an oxidant are introduced into the presence of the electrolyte. The fuel and the oxidant chemically react in the presence of the electrolyte with the assistance of the cathode and the anode. The chemical reaction produces electricity and reaction byproducts. The byproducts are removed and the electricity can be harnessed to some useful end.

One common and popular type of fuel cell is the proton exchange membrane ("PEM") fuel cell, also sometimes known as a polymer electrolyte membrane fuel cell. These fuel cells are also sometimes called "ion exchange membrane" fuel cells. A PEM fuel cell uses hydrogen for a fuel, oxygen for an oxidant, a proton exchange membrane for an electrolyte, and electrodes supporting a catalyst such as platinum. Hydrogen is typically delivered to the anode and oxygen to the cathode. The hydrogen is catalytically split into protons and electrons at the anode. The electrons exit the fuel cell as an electrical current. The protons permeate through the membrane to the cathode, whereupon they react with the oxygen to form water that is drained from the fuel cell.

There are many kinds of fuel cells, however. Depending on the implementation, one or the other of various types of fuel cells may be acceptable. For example, alkaline fuel cells ("AFCs") may perform just as well as PEMs in some embodiments. The selection of the fuel cells 303, the number used, and the manner in which they are stacked will all be implementation specific factors determined by application requirements such as reaction times and power requirements.

For example, in the illustrated embodiment, the end use in the high performance aircraft mitigates for more stringent timing standards. In one particular embodiment, reaction times on the order of milliseconds are found. Very few fuel cell technologies currently exhibit these kinds of reaction times. These reaction time requirements effectively limit the illustrated embodiment to PEM fuel cells with current technology. Other end uses may permit more lax timing requirements, thereby making other fuel cell technologies eligible for use. Advances in fuel cell technology might also yield alternative technologies with acceptable reaction times or improved reaction times for existing technologies.

For a second example, it is well known that certain types of fuel cells can reliably generate certain levels of power. Different power buses will be designed to operate with different load levels and, hence, accommodate different power requirements. The number of fuel cells 303 in the fuel cell stack 300 will therefore reflect the differing power requirements of different power buses 103. The number of fuel cells 303 will also reflect the choice in the fuel cell technology employed, since different types of fuel cells typically generate different levels of power.

The number of fuel cells 303 in the fuel cell stack 300 will therefore vary depending on the end use of the particular embodiment. The end use will drive certain choices, such as fuel cell technology and power requirements, that will in turn influence this aspect of the design. Those in the art having the benefit of this disclosure will readily appreciate these types of influences in implementation and deal with them accordingly depending on their particular end use.

Fuel cells are typically employed as part of a larger, overall system. Such a system will usually include a delivery subsystem for the reactants and a thermal management subsystem. The illustrated embodiment packages all, or at least many, of these components into the fuel cell plant 106 for reasons that will be discussed further below. The application of the present subject matter is not so limited, however, and some embodiments may distribute parts of the fuel cell plant 106.

Still referring to FIG. 3, the fuel cell stack 300 includes three ports 306-308 through which it is supplied and through which flows a fuel 312, an oxidant 315, and a byproduct 318, respectively. More particularly, the housing 321 of the fuel cell stack 300 defines the ports 306-308. The fuel cell plant 106 in the illustrated embodiment also includes a fuel reservoir 324, an oxidant reservoir 325, and a byproduct reservoir 326 in which the fuel 312, oxidant 315, and byproduct 318 may be stored. Some embodiments may remove the reservoirs 324-326 from the fuel cell plant 106 so long as some other means is provided for containment of the fuel 312, oxidant 315, and byproduct 318. The reservoirs 324-326 are fluidly connected to the ports 306-308 using fittings (not indicated) such as are known to the art.

The fuel cell stack 300 also includes a pair of terminals 330, 331 by which it, and the fuel cell plant 106, are electrically connected to the power bus 103. One of the terminals 330, 331 is coupled to the cathode and one is coupled to the anode. The particular order association does not matter from the perspective of the present illustrations, although it will be a consideration in specific implementations. In general, the fuel cell plant 106 sinks power from the power bus 103 into the fuel cell plant 106 when the actual voltage for the power bus 103 approaches the power bus maximum voltage limits. It powers the power bus 103 from the fuel cell plant 106 otherwise.

For example, in the illustrated embodiment, the fuel cells 303 are PEM fuel cells, the fuel 312 is hydrogen ($H_2$), the oxidant 315 is oxygen ($O_2$), and the byproduct 318 is water ($H_2O$). When the actual voltage for the power bus 103 falls below the nominal voltage, the fuel cell plant 106 sources power to the power bus 103 by receiving hydrogen from the fuel reservoir 324 and oxygen from the oxidant reservoir 325 and creating water that is output to the byproduct reservoir 326. Otherwise, when the actual voltage exceeds the nominal voltage of the power bus 103, the fuel cell plant 106 sinks power from the power bus 103 by electrolyzing water from the byproduct reservoir 326 to generate hydrogen and oxygen that is output to the fuel reservoir 324 and the oxidant reservoir 325.

Those in the art will appreciate that delivery of the fuel 312, oxidant 315, and byproduct 318 from their respective reservoirs 324-326 will vary by implementation. The type and number of factors will themselves vary in a manner readily recognizable to those skilled in the art having the benefit of this disclosure. Relevant factors may include the nature of the materials used as well as the end use of the implementation.

For example, the illustrated embodiment employs two gases and a liquid. Although all are fluids, gases and liquids behave similarly in some ways and fundamentally differently in other ways. Gases and fluids typically respond similarly to pressure. On the other hand, gases are rather indifferent to gravity whereas liquids are very strongly subject to it. Other examples for both propositions abound, but these suffice to illustrate the principle. Thus, in designing the delivery of the fuel 312, oxidant 315, and byproduct 318 one must consider the state in which they will nominally exist during use.

For a second example, the illustrated embodiment is intended for use in a high performance aircraft that may maneuver rapidly in each of pitch, yaw, and roll. Various techniques have been developed for the control and handling of fluids, both gases and liquids, in these types of applications and any such technique may be used. Of particular interest, however, is that such an aircraft can typically be expected to roll 360° at some point. Designers should therefore consider the effect of gravity on the delivery of the water or other liquids that might be employed. But not all embodiments will implicate this concern, or at least not to the extent of the illustrated embodiment.

For a third example, the illustrated embodiment employs PEM fuel cells. The membranes should be kept wet, or at least moist. This can be accomplished by wicking water delivered to the fuel cell stack 300 into the fuel cells 303 through a capillary action. However, relatively continuous water delivery should be available to achieve this end. This includes not only actual delivery of the water, but also an adequate supply of water for the expected duration over which the fuel cell plant 106 is expected to be in use. In the illustrated embodiment, for example, care should be exercised to ensure that for a three-hour mission that enough water for the whole three hours is available. This will, in turn, influence system design in the since that the reservoirs 324-326 have sufficient capacity to hold this quantity of materials.

Thus, the fuel cell plant 106 both powers and sinks energy from the power bus 103 through reversible, high-speed electrochemical reactions. While there will be some loss of energy, the reversible reactions will realize extremely high efficiencies in generating and sinking the power onto and from the power bus 103. Furthermore, the fuel cell plant 106 can provide and sink large amounts of energy (e.g., Megaamps/sec) with relatively quick reaction times (e.g., milliseconds).

As those in the art will appreciate, most applications will include multiple electrical loads on the power bus 103. One such embodiment 400 is conceptually illustrated in FIG. 4. In the embodiment 400, a power bus 403 is powered from a fuel cell plant 406 and on which there are at least five electrical loads 409. The number and nature of the electrical loads 409 are not material to the practice of the invention although they may be significant design parameters in an implementation specific fashion.

The topography of the power bus 403 is illustrative only. Those ordinarily skilled in the art having the benefit of this disclosure will appreciate that the bus topography will largely be determined by the placement of the electrical loads 409. Other factors will also be considered such as power management, harnessing, and lead routing considerations.

One consideration in the illustrated embodiment that is related to the use of a fuel cell "plant" is a "black box" capability for the overall system design. One approach to maintaining vehicles and keeping them in service is to design them such that subsystems are self-contained and easily replaceable. If something goes wrong, the subsystem is disconnected from the system, removed, and a new subsystem inserted in its place. The vehicle can then return to service and the errant subsystem can be repaired at leisure.

However, the "black box" design has an added advantage in the illustrated embodiment. As was earlier mentioned, among the design considerations for the fuel cell plant 106 are the demands of the individual mission. For example, a larger capacity fuel cell plant 106 may be required for a longer or otherwise demanding mission than for a shorter, less demanding mission. Multiple versions of the fuel cell plant 106 can therefore be built using the black box design in varying capacities that may then be swapped in and out depending on the assigned mission.

This black box approach will also influence the topography of the power bus 403. The approach generally calls for black box to be located in a place where it is easily accessible. The lines in the power bus 403 consequently are routed to such a location. These and other such considerations are well known to those in the art and may be duly considered in implementation.

Figure 5:
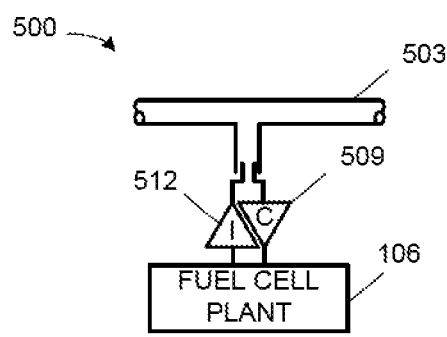
FIG. 5 illustrates a third embodiment in which the power bus is an alternating current bus.

The above embodiments assume that the power buses 103, 403 are DC buses. The invention may nevertheless be used with alternating current ("AC") buses as well. The fuel cell plants 106, 406 will generate and sink DC power only, and so the DC power must be converted to AC power. One embodiment 500, shown in FIG. 5, in which an AC power bus 503 is powered by a fuel cell plant 106, employs a converter 509 for converting power sunk from the power bus 503 to a direct current and an inverter 512 for converting power output by the fuel cell plant 106 to an alternating current.

Returning to FIG. 2, the present invention admits variation in some aspects of implementation. Thus, by way of example and illustration:

the power bus 103 is but one means for transmitting power from the fuel cell plant 106 to the electrical load 203; and the fuel cell plant 106 is but one means for powering a power bus from a fuel cell plant when the actual voltage is less than or equal to a nominal voltage for the power bus; and one means for sinking power from the power bus into the fuel cell plant when the actual voltage exceeds the nominal voltage.

Other embodiments may employ alternative means performing the identical function and having equivalent structure to those disclosed herein.

The phrase "capable of" as used herein is a recognition of the fact that some functions described for the various parts of the disclosed apparatus are performed only when the apparatus is powered and/or in operation. Those in the art having the benefit of this disclosure will appreciate that the embodiments illustrated herein include a number of electronic or electro-mechanical parts that, to operate, require electrical power. Even when provided with power, some functions described herein only occur when in operation. Thus, at times, some embodiments of the apparatus of the invention are "capable of" performing the recited functions even when they are not actually performing them—i.e., when there is no power or when they are powered but not in operation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method comprising:
    powering a power bus from a fuel cell plant when an actual voltage is less than or equal to a nominal voltage for the power bus; and
    sinking power from the power bus into the fuel cell plant when the actual voltage exceeds the nominal voltage.

2. The method of claim 1, wherein:
    powering the power bus includes forming water from hydrogen and oxygen; and
    sinking power includes electrolyzing water to generate hydrogen and oxygen.

3. The method of claim 1, wherein:
    powering the power bus includes generating power responsive to the actual voltage being less than or equal to the nominal voltage of the power bus; and
    sinking power from the power bus includes sinking power from the power bus responsive to the actual voltage of the power bus exceeding the nominal voltage.

4. The method of claim 1, wherein:
    powering the power bus includes converting a direct current to an alternating current; and
    sinking power from the power bus includes converting an alternating current to a direct current.

5. The method of claim 1, wherein the powering and the sinking include a high speed electrochemical reaction.

6. The method of claim 1, wherein the powering and the sinking include an electrochemical reaction on the order of milliseconds.

7. An apparatus, comprising:
    means for electro-chemically powering a power bus when an actual voltage is less than or equal to as nominal voltage for the power bus, the powering means including means for forming water from hydrogen and oxygen; and
    means for sinking power from the power bus when the actual voltage exceeds the nominal voltage, the sinking means including means for electrolyzing water to generate hydrogen and oxygen for water formation.

8. The apparatus of claim 7, wherein:
    the powering means includes means for generating power so long as the actual voltage meets or is lower than the nominal voltage of the power bus; and
    the sinking means includes means for sinking power from the power bus when the actual voltage of the power bus exceeds the nominal voltage.

9. The apparatus of claim 7, wherein:
    the powering means includes means for convening a direct current to an alternating current; and
    the sinking means includes means for converting an alternating current to a direct current.

10. The apparatus of claim 7, wherein the powering means and the sinking means include means for performing a high speed electrochemical reaction.

11. The apparatus of claim 7, wherein the powering means and the sinking means include means for performing an electrochemical reaction on the order of milliseconds.

12. A method, comprising sinking power from a power bus into a fuel cell plant when an actual voltage for the power bus approaches the power has maximum voltage limits and powering the power bus from the fuel cell plant otherwise.

13. The method of claim 12, wherein:
    powering the power bus includes forming water from hydrogen and oxygen; and
    sinking power includes electrolyzing water to generate hydrogen and oxygen for water formation.

14. The method of claim 12, wherein the power bus is an alternating current power bus and:
    powering a power bus includes converting a direct current to an alternating current; and
    sinking power from the power bus includes converting an alternating current to a direct current.

15. The method of claim 12, wherein the powering and the sinking include a high speed electrochemical reaction.

16. The method of claim 12, wherein the powering and the sinking include an electrochemical reaction on the order of milliseconds.

17. An apparatus, comprising:
    a power bus; and
    a fuel cell plant capable of:
        powering the power bus when an actual voltage is less than or equal to a nominal voltage for the power bus; and
        sinking power from the power bus when the actual voltage exceeds the nominal voltage.

18. The apparatus of claim 17, wherein the fuel cell plant comprises:
    a fuel cell stack defining a first, a second, and a third port thereto;
    a fuel reservoir fluidly connected to the first port of the fuel cell stack;
    an oxidant reservoir fluidly connected to the second port of the fuel stack; and
    a byproduct reservoir fluidly connected to the third port.

19. The apparatus of claim 18, wherein the fuel cell stack includes a plurality of fuel cells.

20. The apparatus of claim 18, wherein the fuel cell stack includes a proton exchange membrane fuel cell.

21. The apparatus of claim 17, further comprising:
a converter for converting power sunk from the power bus to a direct current; and
an inverter for converting power output by the fuel cell plant to an alternating current.

22. The apparatus of claim 17, further comprising:
a converter for converting power sunk from the power bus to an alternating current; and
an inverter for converting power output by the fuel cell plant to a direct current.

23. The apparatus of claim 17, further comprising an electrical load on the power bus that is capable of generating power back onto the power bus.

24. The method of claim 17, wherein the powering and the sinking include a high speed electrochemical reaction.

25. The method of claim 17, wherein the powering and the sinking include an electrochemical reaction on the order of milliseconds.

26. An apparatus, comprising:
means for transmitting power to an electrical load; and
means for:
powering a power bus when an actual voltage is less than or equal to a nominal voltage for the power bus; and
sinking power from the power bus when the actual voltage exceeds the nominal voltage;
wherein the powering and sinking means comprises:
a fuel cell stack defining a first, a second, and a third port thereto;
a fuel reservoir fluidly connected to the first port of the fuel cell stack;
an oxidant reservoir fluidly connected to the second port of the fuel stack; and
a byproduct reservoir fluidly connected to the third port.

27. The apparatus of claim 26, further comprising:
means for converting power sunk from the power transmitting means to a direct current; and
means for converting power output by the powering and sinking means to an alternating current.

28. The method of claim 26, wherein the powering and the sinking include a high speed electrochemical reaction.

29. The method of claim 26, wherein the powering and the sinking means includes means for performing an electrochemical reaction on the order of milliseconds.

30. An apparatus, comprising:
means for electro-chemically powering a power bus when an actual voltage is less than or equal to a nominal voltage for the power bus, including means for converting a direct current to an alternating current; and
means for sinking power from the power bus when the actual voltage exceeds the nominal voltage, including means for convening an alternating current to a direct current.

31. The apparatus of claim 30, wherein:
the powering means includes means for generating power so long as the actual voltage meets or is lower than the nominal voltage of the power bus; and
the sinking means includes means for sinking power from the power bus when the actual voltage of the power bus exceeds the nominal voltage.

32. The apparatus of claim 30, wherein the powering means and the sinking means include means for performing a high speed electrochemical reaction.

33. The apparatus of claim 30, wherein the powering means and the sinking means include means for performing an electrochemical reaction on the order of milliseconds.

34. An apparatus, comprising:
means for electro-chemically powering a power bus when an actual voltage is less than or equal to a nominal voltage for the power bus; and
means for sinking power from the power bus when the actual voltage exceeds the nominal voltage;
wherein the powering means and the sinking means include means for performing a high speed electrochemical reaction.

35. The apparatus of claim 34, wherein:
the powering means includes means for generating power so long as the actual voltage meets or is lower than the nominal voltage of the power bus; and
the sinking means includes means for sinking power from the power bus when the actual voltage of the power bus exceeds the nominal voltage.

36. The apparatus of claim 34, wherein the powering means and the sinking means include means for performing an electrochemical reaction on the order of milliseconds.

37. An apparatus, comprising:
means for electrochemically powering a power bus when an actual voltage is less than or equal to a nominal voltage for the power bus; and
means for sinking power from the power bus when the actual voltage exceeds the nominal voltage;
wherein the powering means and the sinking means include means for performing an electrochemical reaction on the order of milliseconds.

38. The apparatus of claim 37, wherein:
the powering means includes means for generating power so long as the actual voltage meets or is lower than the nominal voltage of the power bus; and
the sinking means includes means for sinking power from the power bus when the actual voltage of the power bus exceeds the nominal voltage.

39. An apparatus, comprising:
means for transmitting power to an electrical load; and
means for:
powering a power bus when an actual voltage is less than or equal to a nominal voltage for the power bus; and
sinking power from the power bus when the actual voltage exceeds the nominal voltage;
means for converting power sunk from the power transmitting means to a direct current; and
means for converting power output by the powering and sinking means to an alternating current.

40. The method of claim 39, wherein the powering and the sinking include a high speed electrochemical reaction.

41. The method of claim 39, wherein the powering and the sinking means includes means for performing an electrochemical reaction on the order of milliseconds.

42. An apparatus, comprising:
means for transmitting power to an electrical load; and
means for:
powering a power bus when an actual voltage is less than or equal to a nominal voltage for the power bus; and
sinking power from the power bus when the actual voltage exceeds the nominal voltage;
wherein the powering and the sinking include a high speed electrochemical reaction.

43. The method of claim 42, wherein the powering and the sinking means includes means for performing an electrochemical reaction on the order of milliseconds.

44. An apparatus, comprising:
means for transmitting power to an electrical load; and
means for:
- powering a power bus when an actual voltage is less than or equal to a nominal voltage for the power bus; and
- sinking power from the power bus when the actual voltage exceeds the nominal voltage;
- wherein the powering and the sinking means includes means for performing an electrochemical reaction on the order of milliseconds.

* * * * *